United States Patent [19]

Sargent

[11] Patent Number: 4,861,400
[45] Date of Patent: Aug. 29, 1989

[54] TOOL FOR ELIMINATING AIR VOIDS UNDERNEATH A MEMBRANE SEAM AND METHOD THEREFOR

[76] Inventor: Richard G. Sargent, 70 G. W. Briar, Stafford, Va. 22554

[21] Appl. No.: 159,695

[22] Filed: Feb. 24, 1988

[51] Int. Cl.$^4$ .............................................. B32B 31/00
[52] U.S. Cl. ..................................... 156/71; 156/574; 156/579; 156/582
[58] Field of Search ............... 156/391, 574, 579, 582, 156/555, 87, 71

[56] References Cited

U.S. PATENT DOCUMENTS

| | | | |
|---|---|---|---|
| 2,159,852 | 5/1939 | Homeier | 156/391 |
| 2,225,229 | 12/1940 | Neuwirth | 156/574 |
| 3,098,783 | 7/1963 | Busch | 156/579 |
| 4,289,552 | 9/1981 | Hammer | 156/574 |
| 4,758,291 | 7/1988 | Fechner | 156/391 |

*Primary Examiner*—George F. Lesmes
*Assistant Examiner*—J. Davis
*Attorney, Agent, or Firm*—Fitch, Even, Tabin & Flannery

[57] ABSTRACT

Disclosed is a tool for removing air bubbles trapped between overlapping membrane layers. The tool includes a body about which is spaced a plurality of pressure rollers. The pressure rollers have axes of rotation generally perpendicular to an axis of rotation of the body. A drive shaft has a first end attached to the body and extends along the axis of rotation of the body. The second end of the drive shaft provides attachment to a rotating driving source. When pressure is applied to the drive shaft as the drive shaft is made to rotate, the pressure rollers simultaneously engage the surface of a membrane so as to sweep a circular path thereabout. A method of using the tool is also disclosed, wherein the tool is located adjacent a seam where the layers are overlaid and is translated along the seam as the tool is rotated.

8 Claims, 2 Drawing Sheets

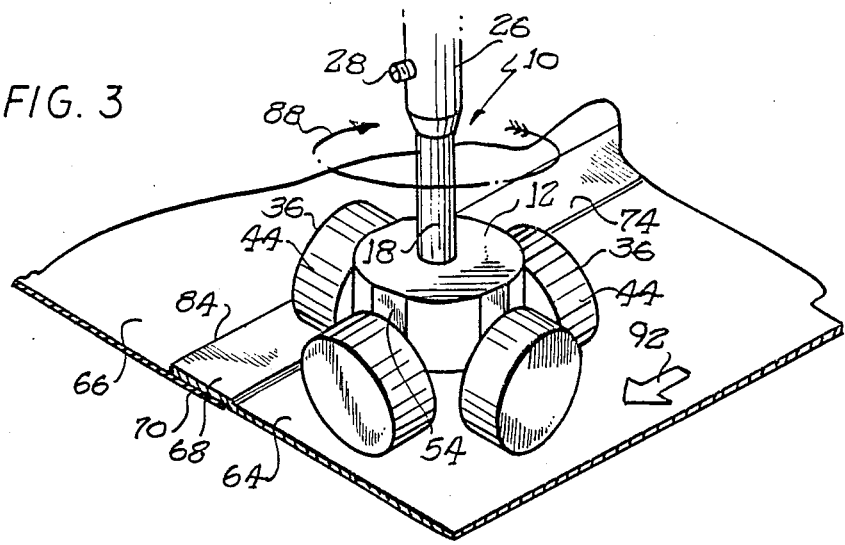
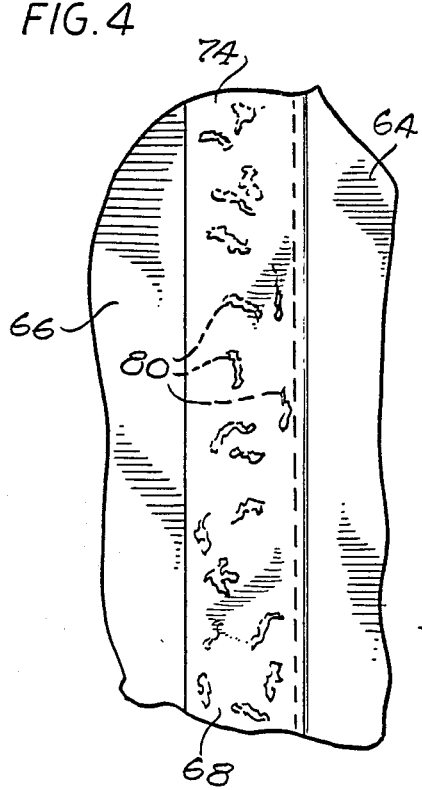
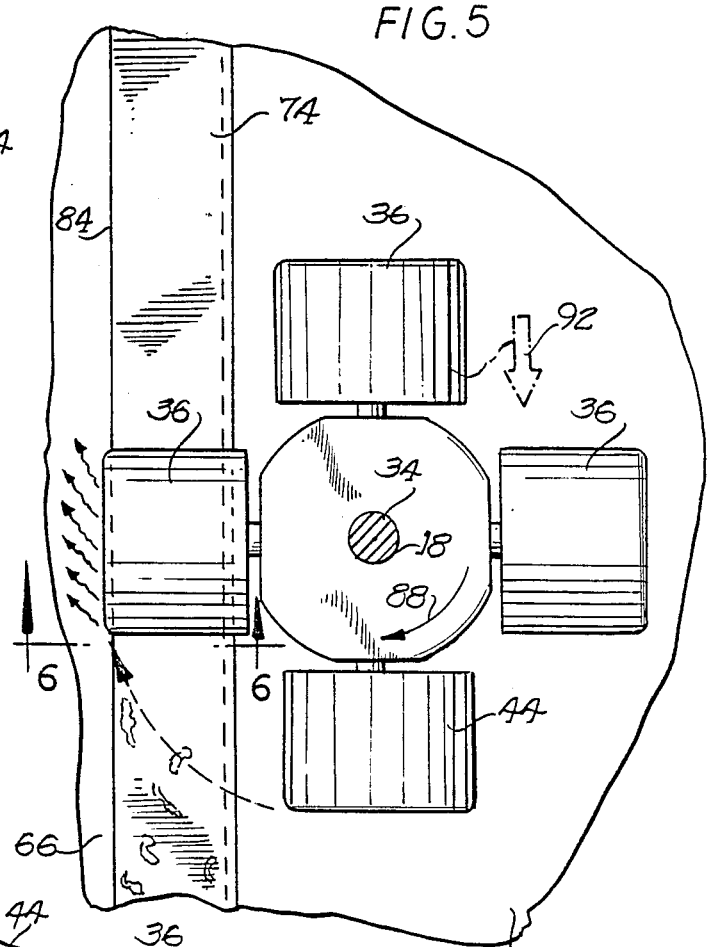
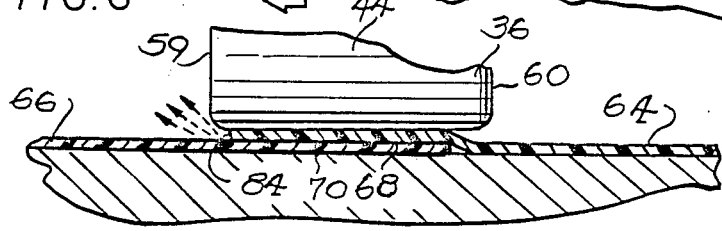

TOOL FOR ELIMINATING AIR VOIDS UNDERNEATH A MEMBRANE SEAM AND METHOD THEREFOR

BACKGROUND OF THE INVENTION

1. Field of the Invention

The present invention pertains to tools and methods of using tools for eliminating air voids trapped underneath a membrane seam, and in particular to such tools and methods using rollers for contacting the membrane. The present invention offers particular advantages when used with roofing membranes.

2. Brief Description of the Prior Art

Flexible sheets or membranes are becoming increasingly popular in many areas of endeavor today. For example, single ply roofing systems cover a roof substrate with at least one layer of an elastomeric membrane. Air pockets are sometimes encountered when membranes are overlapped and joined with a liquid adhesive to form a continuous seam. Often, the strongest adhesive bond is created when the thickness of the adhesive layer underneath the membrane is carefully controlled, and air pockets trapped between the membranes can affect the thickness of the adhesive. Air pockets are also objectionable because they might totally displace adhesive from a given area of the membranes to be joined.

For these and other reasons, it is often desirable to eliminate air pockets, voids or gas bubbles from underneath a membrane. Air pockets are displaced from a given spot by being forced to travel underneath the membrane seam, under the application of a traveling pressure wave usually generated by a scraper blade or a pressure roller. However, in some applications, blades and rollers cannot be used effectively to remove air pockets in a practical commercial environment. For example, roofing systems sometimes employ relatively thick or heavy gauge moisture-impervious strips or sheets of elastomeric membrane material such as neoprene or polyvinyl chloride. Although roofing membranes are sometimes manufactured in widths up to 40 feet, large area roofs require several strips of the membrane material to be laid side-by-side so as to form a continuous covering extending across the entire surface area of the roof. In order to provide moisture-proof joints between adjacent sheets, the edges thereof are sometimes overlaid one on top of the other, and a liquid adhesive is applied between the overlapping portions. The seams formed in this manner are often quite long. Pushing a pressure roller along the length of the seams is frequently ineffective for removing air pockets since the air pockets are thereby made to travel great distances along the length of the seam and control thereover is frequently lost, with the air pockets, or a portion thereof remaining trapped under the membrane. Also, it is difficult to continuously control the pressure applied to the seam. As a result, concentrated effort is frequently required to address problem areas along the seam.

Given the presence of a membrane edge immediately adjacent the seam, it is desirable to force the air pockets in directions generally transverse to the seam, thereby minimizing the path length of travel underneath the membrane. However, using pressure rollers in multiple, relatively short strokes transverse to the seam is a tedious operation and is inefficient when air bubbles escape sideways from the pressure wave set up by the roller, traveling along the seam in a direction not intended. Accordingly a particular portion of the seam may have to be treated several times before most air bubbles are eliminated therefrom.

SUMMARY OF THE INVENTION

It is therefore an object of the present invention to provide a tool made from a minimum number of inexpensive parts which is relatively easy to use, and which is effective in eliminating air pockets, gas bubbles, voids or the like from underneath a membrane.

Yet another object of the present invention is to provide a tool which quickly and effectively eliminates air pockets trapped in a seam formed by overlapping two membrane layers.

Yet another object of the present invention is to be provide a tool of the above-described type which is suitable for a method of use wherein the tool is applied to the seam in directions along the length thereof, thereby contributing significantly to the speed with which the seam can be treated.

Still another object of the present invention is to provide a tool of the above-described type which is relatively lightweight and which is suitable for use in roofing operations.

These and other objects of the present invention are provided in a tool for eliminating gas bubbles trapped underneath a membrane, including a body having an axis of rotation and means for mounting the body for rotation about the axis. Wheel means are provided, each having an axis of rotation generally perpendicular to the axis of rotation of the body and each further having an outer periphery for engaging the membrane. The wheel means are rotatably mounted to the body so that the wheels roll along the membrane when placed in contact therewith, and the body is rotated about the axis of rotation thereof.

Other objects are provided in a method for eliminating gas bubbles trapped underneath a membrane having a seam adjacent a continuous edge of the membrane, consisting of the following steps providing a plurality of pressure rollers each having respective of rotation and outer membrane-engaging surfaces;

aligning the rollers so that their outer surfaces engage the membrane outer surface;

rotating the rollers about their respective axes of rotation while moving them along a curved path which crosses over the membrane edge, so that the outer roller surfaces roll across the membrane outer surface along a curved path which crosses the membrane edge; and moving the rollers along the seam while rotating them about their respective axes of rotation, and while repeatedly moving the rollers along the curved path so that the roller outer surfaces traverse the membrane seam by repeatedly crossing the membrane edge with at least partially overlapping paths of travel.

BRIEF DESCRIPTION OF THE DRAWINGS

In the drawings, wherein like elements are referenced alike,

FIG. 3 is a perspective view of the tool of FIGS. 1 and 2 illustrating its method of use with a seam formed by two overlapping membranes;

FIG. 4 is a plan view of the seam of FIG. 3 shown prior to treatment by the seaming tool;

FIG. 5 is a top plan view corresponding to FIG. 3, shown on an enlarged scale; and FIG. 6 is a fragmentary, cross-sectional elevational view taken along the line 6—6 of FIG. 5.

DETAILED DESCRIPTION OF THE PREFERRED EMBODIMENT

Figure 1:
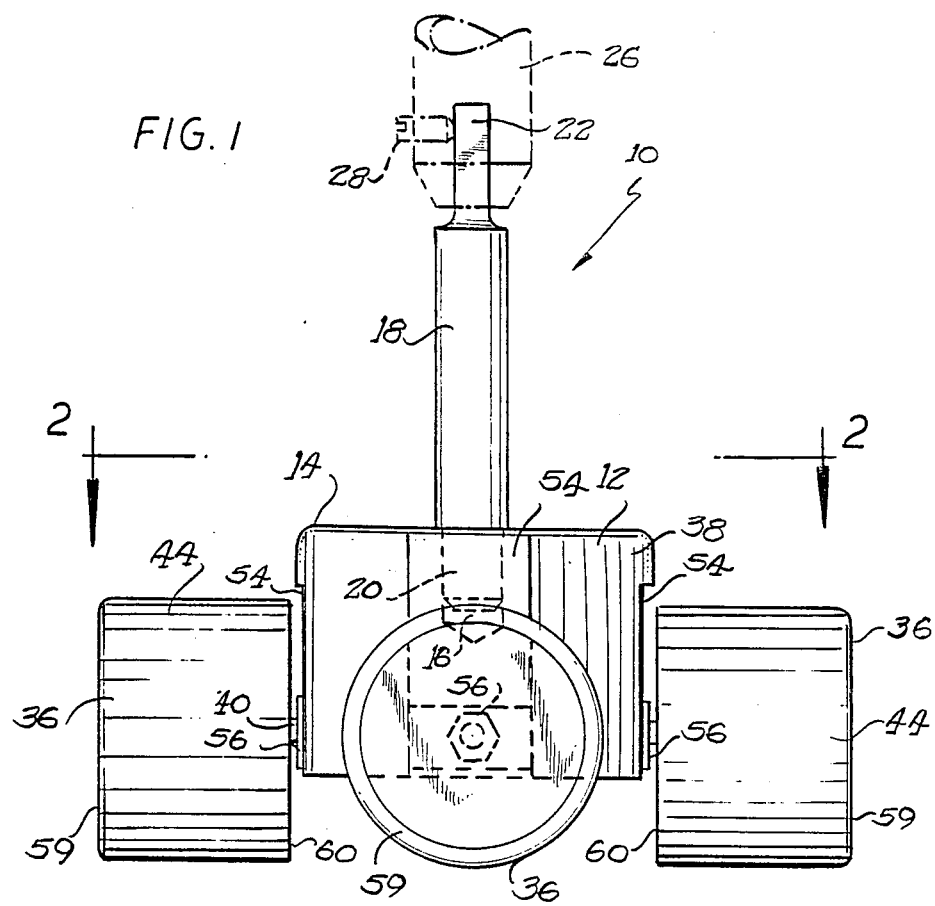
FIG. 1 is a front elevational view of a seaming tool embodying aspects of the present invention.

Referring now to the drawings for purposes of illustration but not limitation, a seaming tool is generally indicated at 10. The tool 10 has a generally cylindrical body 12 with a generally circular upper wall 14. A recess generally indicated at 16 extends from upper wall 14 along the central axis of the body. Recess 1 is preferably threaded for securement to a generally cylindrical drive shaft 18. The drive shaft 18 includes a first threaded end 20 engageable in the threaded recess 16 and a second, generally upper end 22 for engagement with a rotating drive means. Illustrated in phantom in FIG. 1 is an example of a rotating drive means including of a chuck 26 having a setscrew 28 for engaging a turned-down shank portion of drive shaft 18, comprising the upper end 22 thereof. Chuck 26 may, for example, be connected to an electric or pneumatic drill. It is generally preferred that the recess 16 be centered along the longitudinal axis of cylindrical body 12 and be deep enough so as to provide an orientation of the drive shaft 18 generally normal to the axis of the body. Thus, the central longitudinal axis of body 12 coincides with an axis of rotation of the body in the cross-sectional plan view of FIG. 2. The axis of rotation of body 12 is seen as a point located in the center of the cross section of drive shaft 18 and is identified by the reference numeral 32.

A plurality of pressure rollers are spaced about an outer side wall 38 of body 12. As illustrated in the figures, the preferred embodiment employs four pressure rollers equally spaced about the side wall 38. The rollers of the preferred embodiment comprise cylinders having an axial length of the same order of magnitude as their outer diameter, as can be seen by comparing the various pressure rollers illustrated in FIG. 1. The pressure rollers 36 have longitudinal axes extending generally perpendicular to the axis 34 of body 12. For reasons which will become apparent herein, the axes of rotation of the pressure rollers 36 extend in generally radial directions from the axis 34 of body 12 so that the direction of rotation of the pressure rollers is generally tangent to body 12. Pressure rollers 36 are mounted for rotation about their longitudinal axes by mounting shafts 40 having threaded free ends. Body 12 has a plurality of radially directed recesses 42 inwardly extending from side wall 38 so as to receive the threaded ends of mounted shafts 40.

In the preferred embodiment, pressure rollers 36 each have the same outer diameter and recesses 42 for receiving their mounting shafts arranged in a common plane generally perpendicular to the axis of rotation of body 12. Each roller 36 has an outer surface 44 which, as will be seen, contacts the membranes to be treated. As can be seen in FIG. 1, the lowermost portions of the outer surfaces 44 of the pressure rollers lie in a common plane, an advantageous feature since the rollers will sweep a circular, planar path as body 12 is rotated about its longitudinal axis and since the membranes to be treated are usually oriented in a plane. In the preferred embodiment the pressure rollers 36 have a low friction rotational mounting which may be provided by sleeve bearings but is preferably provided by roller bearings which maintain a smooth, low friction rolling of the pressure rollers 36 despite pressure loads applied to them during a seaming operation.

Figure 2:
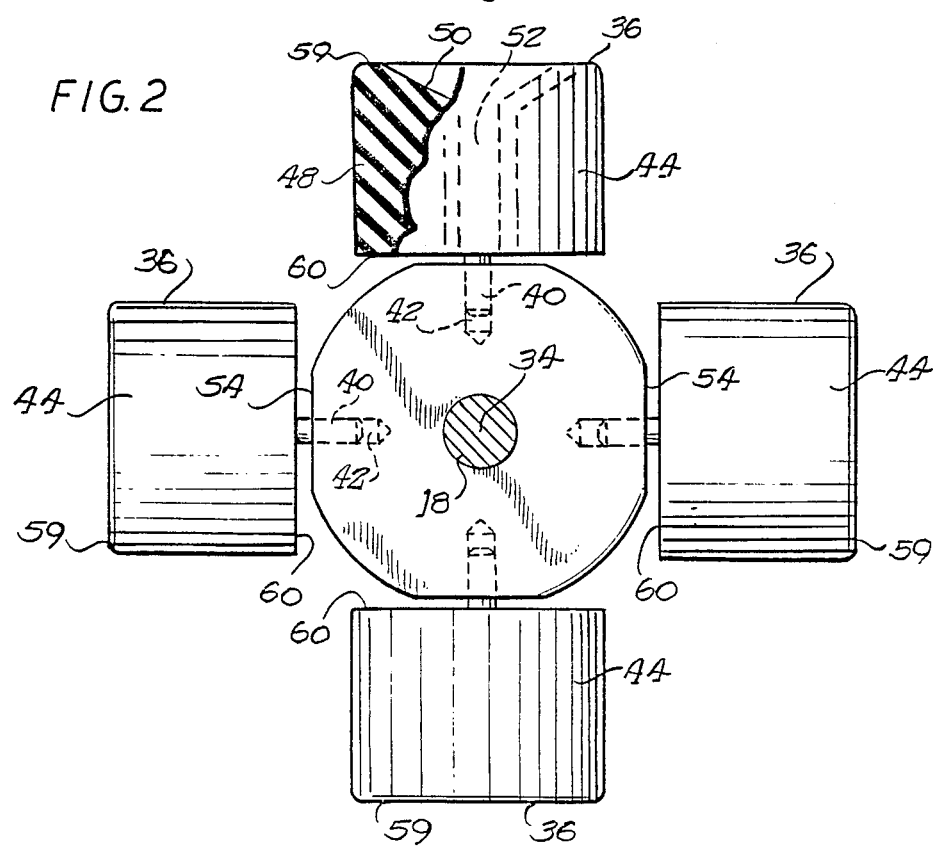
FIG. 2 is a cross-sectional view, shown partly broken away, taken along the line 2—2 of FIG. 1 and looking in the direction of the arrows.

As indicated in FIG. 2, rollers 36 are preferably solid, having an outer cylindrical surface portion 48 and a tapered or conical wall portion 50 terminating in an axial bore 52 for receiving the mounting shaft 40. The pressure rollers 36 have an inner side wall 60, adjacent body 12 and an outer side wall 59 which faces away from body 12. Due to the tapered wall 50, side wall 59 is a relatively thin annular ring, whereas the inner side wall 60 comprises a circular disk. The material for pressure rollers 36 is chosen, in part, so that the outer surface 48 is somewhat resilient, yet rigid enough so as to maintain a coplanar alignment with the other pressure rollers throughout substantially the entire width of the outer cylindrical circle. Preferably, the pressure roller 36 of the preferred embodiment is strong enough so as to remain rigid, without collapsing under the application of pressure during a seaming operating.

The outer wall 38 of body 12 is generally cylindrical, and a series of flat surfaces 54 are formed thereon adjacent each pressure roller 36 to facilitate the drilling and tapping operations for forming the recesses 42 and to provide a seating surface for lock nuts 56 (see FIG. 1) to secure the mounting shafts to body 12. The flat surfaces 54 also provide an increased clearance between wall surface 38 and the inside edge 60 of the pressure rollers. If desired, however, other arrangements for mounting the pressure rollers to body 12 can be provided. For example, the flat surfaces 54 can be omitted if the mounting shafts 40 are extended slightly to provide the necessary clearance between the inside edges 60 of the pressure rollers and the outer wall 38 of body 12. Also, body 12 need not be cylindrical in configuration but can, for example, be square in plan view and can have rectangular side walls, one side wall associated with each pressure roller. One advantage of the cylindrical body 12 is its resulting weight reduction due to the rounding of corners between adjacent pressure rollers. Further weight reduction can be achieved by forming body 12 so as to have a hollow interior, the body generally resembling a cup-shaped member with a downwardly opening cylindrical recess. With this arrangement, the lock nuts 56 can, if desired, be located in the interior of the body adjacent the free end of each mounting shaft 40.

Referring now to FIG. 3, a tool 10 is shown in association with two generally planar membranes 64, 66 having partially overlapping edge portions 68, 70. Membrane 64 has an edge portion 68 lying above the edge portion 70 of membrane 66. The result is a continuous seam 74. A liquid adhesive is applied between the edge portions 68, 70 to complete the seam construction. The present invention has found immediate acceptance in the roofing industry, for example, where membranes 64, 66 each comprise fairly long strips of waterproof membrane material spanning the edges of a roof to be continuously protected by an outer waterproof covering. Accordingly, there are a significant number of seams 74, especially for large size roofs, and each seam 74 is typically quite long, often many yards in length. The overlapping membrane edge portions and accordingly the seam 74 is typically two inches or at most only a few inches wide. A liquid adhesive is typically applied between the opposing faces of the membrane edge portions 68,70 after the membranes are positioned as desired. In one example, the upper membrane edge portion 68 is temporarily lifted and a liquid adhesive is applied between the membrane edge portions. The upper membrane edge portion 68 is then lowered onto the liquid adhesive coating.

As illustrated in FIG. 4 air pockets, voids or gas bubbles 80 have been observed to form between the membrane edge portions, extending throughout significant portions of the length of each seam 74. Such air pockets are objectionable in that they compromise the strength of the adhesive bond since the liquid adhesive coating is displaced or significantly reduced in thickness at each location of an air pocket. Further, the presence of air pockets in the seam 74 is particularly objectionable when the seam is relied upon to provide a continuous moisture-proof barrier. If not otherwise eliminated, air pockets can provide a cite of moisture accumulation and, with repeated freezing and thawing, for example, can possibly deteriorate the moisture-proof integrity of the seam 74. Accordingly, it is highly desirable that the air pockets be quickly and easily removed, preferably in a continuous and rapid treatment of the seam.

Referring now to FIGS. 3-6, a tool 10 according to the present invention is placed on the uppermost sheet 64 adjacent the edge portion 68 thereof. The tool 10, as indicated in FIG. 5, is positioned so that the pressure rollers 36 thereof extend partly beyond the seam 74 that is, partly beyond the free edge 84 of the upper membrane 64. The tool is positioned so that the outer cylindrical surfaces 44 of each pressure roller 36 simultaneously engage the upper surface of the membrane 64. As drive shaft 18 is rotated in a generally clockwise direction indicated by arrow 88, (see FIG. 3) pressure rollers 36 sweep a circular path forming a generally circular band having a width corresponding to the width of the pressure rollers, that is, the distance between their outer side walls 59 and their inner edges 60.

A sufficient amount of downwardly directed pressure is applied to drive shaft 18 as the tool is rotated about the longitudinal axis of the drive shaft, so as to generate a rolling pressure force as the pressure rollers 36 roll along the circular path described above. Each roller 36 thereby generates a traveling pressure wave generated at the point of contact between the outer surface 44 of the pressure roller and the membrane it contacts. Preferably, the pressure rollers are rigid enough so as not to flatten significantly under the application of a pressure force to shaft 18. As a result, pressure rollers engage the membrane along lines of contact formed between their inner and outer side walls 59, 60 thereby imparting a maximum continuous pressure across the width of the roller. Referring to FIG. 1, for example, the central roller 36 visible in the figure has a generally circular outline. The lowermost point on the circular outline defines the point of contract with the membrane. Since the contact with the membrane is preferably continuous across the width of the roller, the rollers 36 engage the membrane along a line. Thus, the pressure exerted by shaft 18 on the membrane is maximized. This generates a traveling pressure wave of maximum amplitude as the roller rolls along its circular path. The term "effective control" as used herein, means the direction of travel of the air pockets is controlled by the pressure rollers, with the pressure rollers squeezing out air pockets along the path of roller travel. Each pressure roller 36 thereby generates a traveling pressure wave slightly wider than the width of each roller 36 which effectively maintains control over each air pocket 80 as the roller advances along its circular path. As the air pockets reach the free edge 84 of membrane 64, they are free to escape to the atmosphere as they are no longer trapped between the membranes 64, 66.

In addition to rotating about the axis of shaft 18, tool 10 is translated in the direction of arrow 92, along the length of seam 74. Thus, the rotating pressure rollers 36 can, in effect, be continuously moved along seam 74 to remove any air pockets that may be trapped the therein. It is generally preferred that the speed of translation of the tool be matched to its speed of rotation such that at least adjacent pressure rollers 36 form partly overlapping curved, arcuate paths as the tool rotates about axis 34. With multiple pressure rollers as illustrated in the preferred embodiment, a relatively large number of passes are experienced by each incremental length of seam 74 and the incremental lengths can be made quite small. For example, according to one aspect of the present invention, the rate of revolution of tool 10 about axis 34 is made sufficiently high relative to its translation speed in the direction of arrow 92 so that each of the four rollers traverses a substantially complete circular path (about the axis 34) before the tool is translated a significant amount relative to the width of the pressure rollers. Thus, each incremental portion of seam 74 (substantially smaller than the width of the pressure rollers) receives four successive pressure waves as the four pressure rollers complete their circular path. Further, several circuits of the roller paths can be easily completed before the tool is translated a significant amount. For example, the tool 10 can be rotated at a speed of several hundred revolutions per minute while it is translated several inches per second. Each incremental length of seam 74 will receive a relatively large number of successive pressure waves, especially when the amount of overlap with successive rotation of the tool is taken into account.

Further advantages are attained with the tool according to the present invention. For example, it can be seen from studying FIGS. 3 and 5 that the free edge of the underlying membrane 66 receives rolling pressure along lines of contact extending at angles to the free edge of the membrane. Thus, the membrane edge remains undisturbed. The portion of the upper membrane 64 adjacent the free edge of the lower member membrane 66 is also undisturbed since the pressure rollers 36 travel toward the edge of that upper membrane and accordingly the upper membrane also remains in place. The lead roller engaging the upper membrane always travels from an interior portion of the membrane toward the outer edge thereof thus enhancing the adhesive bond between the free edge of the membrane and the lower underlying membrane. Only after the free edge of the upper membrane has been treated, are the pressure rollers allowed to cross over the free edge in a direction extending from the free edge toward an interior portion of the upper membrane. Thus, any lifting or folding back of the free edge 84 which might result in unwanted creases is effectively eliminated and an effective adhesive bond is established throughout substantially the entire width of the seam, particularly at the outer free edge of the upper membrane, the edge of the seam exposed to outside forces of wind, rain, ice and the like.

Several variations are possible for the tool described above. For example, the body mounting the rollers need not be rotated about a central axis thereof, but can be rotated so that the rollers sweep elliptical paths. However, this arrangement is generally not preferred because maintaining a uniform pressure on the membrane is made more difficult, as opposed to rollers which sweep generally circular paths.

In another variation, the pressure rollers 36 can be formed as hollow cylinders if they are mode rigid enough to avoid flexing under pressure. The rollers can, alternatively, be made from a composite of materials, such as a rigid hollow core, and an outer covering of semi-resilient or rigid material, for example, having the desired coefficient of friction necessary to maintain a rolling engagement with the membrane, rather than a sliding engagement. Further, although the pressure rollers described above are mounted to the sides of a central body 12, the pressure rollers could also be mounted in upwardly extending recesses formed in the underside portion of the central body. The pressure rollers could, if desired, be located such that their ends lie immediately adjacent the axis of rotation of the tool.

The rollers described above have generally equal outer diameters and hence the axis of rotation of the rollers are aligned in a common plane. The pressure rollers, even though mounted to a common body, need not all have the same size diameter. For example, larger and smaller diameter rollers may be mounted to the same body for simultaneous rotation therewith as the body is rotated. In order to insure engagement between all rollers mounted to the body and the outer membrane surface, the larger diameter rollers preferably have axes of rotation spaced further away from the outer membrane surface than do the smaller pressure rollers, it being desirable that the lowermost tangent points of all pressure rollers be aligned in a common plane corresponding to the plane of the outer membrane surface. The rollers preferably have axes of rotation generally perpendicular to the axis of the tool body. The rollers can, for example, have angled vertical offsets in their mountings, but the rollers will still have axes of rotation perpendicular to the body axis 34.

As mentioned above, the tool according to principles of the invention has found immediate commercial application in the field of roofing securement systems. In particular, the tool is particularly useful in eliminating air voids trapped in the seams of membranes of an elastomeric composition. It is especially important in roofing systems that the membranes not be punctured or otherwise damaged so as to compromise their ability to provide a moisture barrier. As will be readily appreciated by those skilled in the art of fabricating roofing systems, the substrates upon which the roofing systems are laid are seldom perfectly flat. The elastomeric membranes typically used in roofing systems are sufficiently flexible so as to conform to both large and relatively small size surface contours. It is important, however, that the pressure rollers maintain a continuous intimate engagement with the membrane throughout their path of travel. Also, it is preferred that the entire width of the rollers continuously engage the membrane. Accordingly, it has been found necessary to provide pressure rollers having some resilience in their outer surface. However, the pressure rollers must also be firm enough so as to transmit the pressure force necessary to establish a pressure wave effective for displacing voids trapped between the membranes. Also, it is necessary that the outer surface of the pressure rollers have a coefficient of friction sufficient to insure their continued rolling motion as the tool is rotated about the axis of its drive shaft. Those skilled in the art will readily recognize that there is a wide variety of materials that can satisfy the above-enumerated requirements. One example of such materials is polyurethane. Other suitable materials such as neoprene can also be used and such is contemplated by the present invention.

In order to avoid encumbering the above description of the tool and tool operation of the tool according to the present invention, the pressure rollers were described as sweeping generally circular paths of travel during a seaming operation. It is certainly true that the pressure rollers sweep circular paths in the sense that they are each rotated about an axis of rotation. However, it will be appreciated that with any finite translation of the tool, the pressure rollers, throughout their total path of travel along the seam, will, from another point of view, traverse a generally curved, noncircular path since the center or axis of rotation of the rollers undergoes movement. For example, the path traced by the pressure rollers as the body is rotated about the axis thereof, and as the body is translated, comprises what may be generally termed as a cycloid-like or pseudocycloid curve. The term "cycloid" is generally defined as a curve traced by any point on the circumference, or on a radius, of a circle which rolls without slipping through one complete revolution along a straight line in a single plane. As will now be appreciated in light of the foregoing description, the outer surface of the pressure rollers may slip before completing any given revolution about the axis of the body. Although generally undesirable, a certain amount of slipping between the pressure rollers and the outer membrane surface can be tolerated. One reason for the undesirability of such slipping is that the pressure rollers are made to traverse a path which repeatedly crosses over the membrane edge, leaving and reentering the membrane surface. Although slipping of the pressure rollers is not particularly crucial as the rollers leave the membrane surface as they cross over the membrane edge, there is a risk that the membrane edge might be "kicked-up" or lifted as the pressure roller subsequently crosses the membrane edge so as to once again traverse the membrane outer surface.

Further, although the tool of the present invention, particularly when employed in roofing securement systems, will be translated along a straight line during a seaming operation, it will be appreciated that the body of tool 10 can be moved in paths other than a straight line. For example, the body of tool 10 can be moved along curved or arcuate paths, including cycloid-like paths. It is generally desirable, however, that the pressure rollers, with each successive rotation about the axis of the tool body, sweep partially overlapping paths of engagement with the membrane outer surface so as to maintain control over air bubbles and the like trapped underneath the membrane seam.

It will thus be seen that the objects hereinbefore set forth may readily and efficiently be attained and, since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A tool for eliminating gas bubbles trapped underneath a membrane, comprising:
    a body having an axis of rotation;
    means for mounting said body for rotation about the axis;
    a plurality of generally cylindrical wheels means each having an axis of rotation generally perpendicular to the axis of rotation of said body and each further having opposed inner and outer ends facing toward and away from the body, respectively, and an outer periphery for engaging said membrane; and
    mounting means for rotatably mounting said wheel means to said body so that said wheels roll along the membrane when placed in contact therewith and said body is rotated about the axis of rotation thereof, said mounting means including an axle for each wheel aligned along the axis of rotation thereof and extending from the inner end of each said wheel, inwardly into said body toward a center thereof and said mounting means further including means in said body adjacent the center thereof to provide a cantilever support for said axles.

2. The tool of claim 1 wherein said wheel means are each spaced a common radial distance from the axis of rotation of said body.

3. The tool of claim 1 wherein said body is generally cylindrical.

4. The tool of claim 1 wherein the axes of rotation of said wheel means are coplanar.

5. The tool of claim 1 wherein said wheel means comprise wheels having approximately equal outside (diameter) diameters.

6. The tool of claim 3 wherein said body defines flat surfaces on its outer periphery, said wheel means located at said flat surfaces.

7. The tool of claim 1 wherein said wheel means have inner ends spaced form the axis of rotation of said body so as to allow translation of said tool as said body is rotated.

8. A method for eliminating gas bubbles trapped underneath a membrane having an outer surface, a continuous edge, and a seam adjacent the continuous edge of the membrane, comprising the steps of:
    providing a plurality of generally cylindrical pressure rollers each having respective axes of rotation, inner and outer opposed ends, and outer cylindrical membrane-engaging surfaces;
    providing a body having an outer surface and a central axis of rotation; aligning the inner ends of said pressure rollers immediately adjacent spaced-apart portions on the outer surface of said body so that the axis of rotation of each roller is generally perpendicular to the axis of rotation of said body;
    providing a plurality of axles, one for each pressure roller extending from an inner end thereof along the axis of rotation thereof;
    rotatably mounting the pressure rollers to said body by inserting a free end of each said axle into said body thereof;
    aligning said rollers so that the outer cylindrical surfaces thereof engage said membrane outer surface;
    rotating said body about the axis of rotation thereof so that, with the rollers brought into engagement with said membrane, rotating of said body causes a rotating of said rollers about their respective axes of rotation while moving said rollers along a curved path which crosses over the membrane edge, so that the outer, membrane-engaging roller surfaces roll across said membrane outer surface along a curved path which crosses the membrane edge; and
    translating said body along said seam while rotating said body so that said roller outer surfaces traverse the membrane seam by repeatedly crossing the membrane edge with at least partially overlapping paths of travel.

* * * * *

UNITED STATES PATENT AND TRADEMARK OFFICE
CERTIFICATE OF CORRECTION

PATENT NO. : 4,861,400
DATED : August 29, 1989
INVENTOR(S) : Richard G. Sargent

It is certified that error appears in the above-identified patent and that said Letters Patent is hereby corrected as shown below:

In column 2, line 43, after the word "steps" insert a colon--:--.

In column 2, line 45, after the word "respective" insert the word --axes--.

In column 3, line 21, change the numeral "1" to the numeral --16--.

In Claim 7, line 40, change the word "form" to the word --from--.

Signed and Sealed this

Twenty-first Day of August, 1990

Attest:

HARRY F. MANBECK, JR.

*Attesting Officer*   *Commissioner of Patents and Trademarks*